June 20, 1939. H. A. MEISSNER 2,163,150
OIL REFINING APPARATUS
Filed Aug. 14, 1937
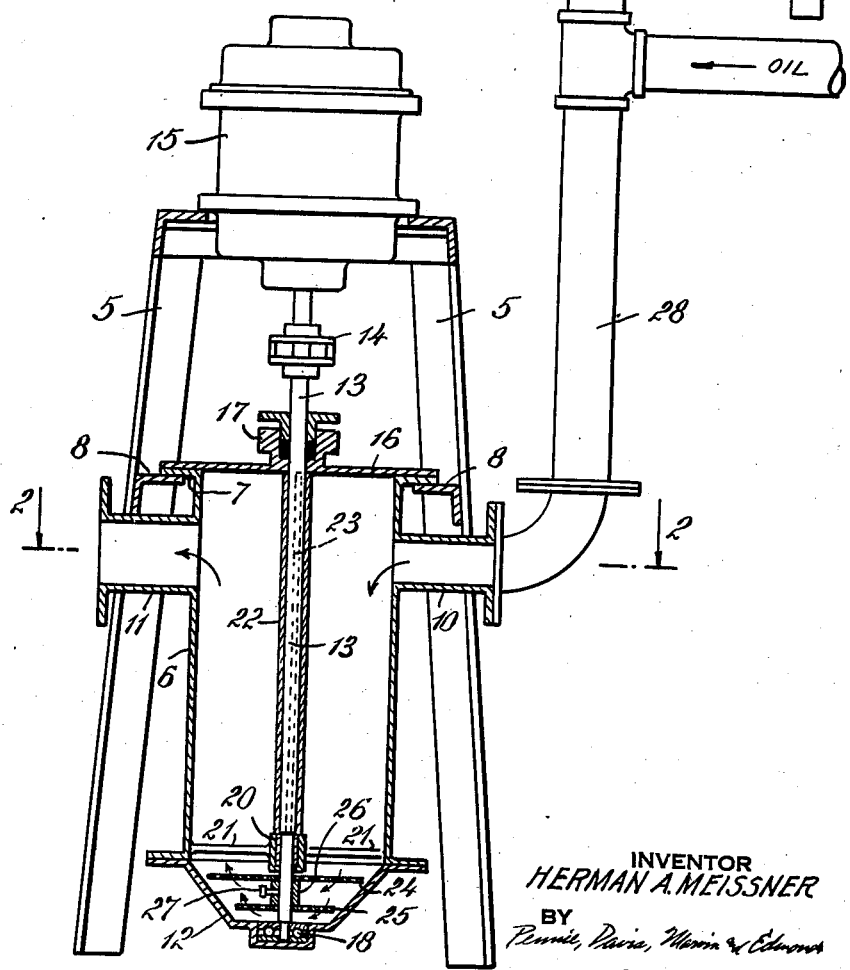
INVENTOR
HERMAN A. MEISSNER
BY
ATTORNEYS Patented June 20, 1939

2,163,150

UNITED STATES PATENT OFFICE 2,163,150

OIL REFINING APPARATUS

Herman August Meissner, Wellsville, N. Y., assignor to Sinclair Refining Company, New York, N. Y., a corporation of Maine Application August 14, 1937, Serial No. 159,104

6 Claims. (Cl. 259—7)

This invention relates to a mixing device and has for an object the provision of improved apparatus particularly applicable in the refining of hydrocarbon oils. More particularly, the invention relates to a mixing device for incorporating addition agents in hydrocarbon oils and the like.

Serious difficulty has been encountered heretofore, for example, in incorporating addition agents in hydrocarbon lubricating oils and the like. Due to the generally limited solubility of addition agents in hydrocarbon lubricating oils and the like it is necessary to produce as complete a dispersion of the addition agent in the lubricating oil as is possible. This dispersion is customarily carried out in a suitable mixing device. With the mixing devices heretofore available it has been found that a thorough dispersion of the addition agent in the form of fine particles in the oil has not been accomplished. Inasmuch as the mixing devices used heretofore have not been capable of producing a dispersion of extremely fine particles of the addition agent in the oil, there has been noted a marked tendency for the particles of addition agent to settle toward the bottom of a tank in which the treated oil is stored. As a result of this condition a sample of treated oil removed from the upper portion of the storage tank frequently has substantially different physical characteristics from a sample of treated oil withdrawn from the lower portion of the storage tank. Such a variation in the physical characteristics of the treated oil has necessitated heretofore a recirculation of the contents of the storage tank in order to accomplish further intimate mixing of the oil and addition agent.

In order to overcome the difficulties mentioned above, I have devised a novel apparatus for intimately contacting substances as, for example, an addition agent and a hydrocarbon oil or the like whereby a thorough dispersion of extremely fine particles of the addition agent may be incorporated in the oil.

More particularly, the apparatus of my invention comprises a shaft, a plurality of perforated discs adapted to be rotated by the shaft, means for passing a fluid mixture through the perforated discs, and means for withdrawing the fluid mixture passed through the perforated discs. The shaft and perforated discs are enclosed with advantage in a suitable chamber at least a portion of which is divided vertically into a plurality of compartments with the shaft extending vertically between the compartments. The perforated discs are preferably located adjacent the lower open portion of these compartments so that a liquid mixture flowing from one compartment to the other must pass at least in part through one or more of the rotating perforated discs.

The details of the apparatus of my invention will be more fully understood by consideration of the accompanying drawing in which—

Figure 1 comprises a side view, partly in section, of my novel mixing device; and Figure 2 comprises a horizontal sectional view taken along line 2—2 in Figure 1.

The mixing device shown in Figure 1 comprises a suitable frame 5 preferably tapered so as to have a smaller cross-section adjacent the upper portion of the framework than at the lower portion thereof. A cylindrical mixing chamber 6 provided with a flange 7 adjacent the upper portion thereof is supported within the frame by means of angle irons 8 or the like which engage the flange of the mixing chamber. The upper portion of the mixing chamber is provided with an inlet comprising conduit 10 and an outlet comprising conduit 11, the inlet and outlet being positioned substantially opposite one another. The lower portion of the mixing chamber is suitably connected with section 12 which is substantially frusto-conical in shape. A drive shaft 13 extends along the vertical axis of the mixing chamber and is suitably connected, for example, by means of a flexible coupling 14, with an electric motor 15 or the like mounted on the upper portion of frame 5. The cover member 16 of the mixing chamber through which the drive shaft extends is provided with a packing gland 17 for sealing the mixing chamber against leakage of fluid through the drive shaft opening in the cover member. The drive shaft is suitably mounted in a thrust-bearing 18 adjacent the lower portion of the frusto-conical end of the mixing chamber and is further supported in a bearing 20 held in position by cross bars 21 positioned adjacent the lower end of the cylindrical portion of the mixing chamber. The drive shaft is encased in a tube 22 extending from the cover member of the mixing chamber to the bearing 20 positioned adjacent the lower end of the cylindrical portion of the mixing chamber. A vertical partition 23 is appropriately welded to the outer surface of the tube 22 and extends radially to the walls of the mixing chamber as shown in Figure 2. The partition extends with advantage from the cover member of the mixing chamber to the cross bar supporting bearing 20 and is so positioned within the mixing chamber as to divide the chamber into two sections with inlet 10 communicating with one section and outlet 11 communicating with the other section.

A relatively large perforated disc 24 and a relatively smaller perforated disc 25 are mounted on the lower portion of the shaft at right angles to the axis thereof. The perforated discs are maintained in spaced relationship to one another by means of tube 26 and are firmly secured to the tube as, for example, by welding or the like. The tube is keyed to the shaft by any suitable means such, for example, as bolt 27. The perforated discs extend substantially to the side walls of the frusto-conical section 12 of the mixing chamber with the larger disc positioned with advantage closely adjacent the lowermost portion of partition 23 and with the smaller disc positioned intermediate the larger perforated disc and the bottom of the mixing chamber.

The inlet 10 communicates with a suitable header 28 having supply pipes for the oil to be treated and the addition agent, respectively, connected thereto.

In using the apparatus of my invention, the oil to be treated and the addition agent are introduced into header 28 and the fluid mixture of oil and addition agent is introduced into the mixing chamber through inlet 10. The perforated discs are then rapidly rotated by means of the electric motor. The mixture of oil and addition agent being admitted to the mixing chamber preferably under pressure substantially fills the inlet compartment of the mixing chamber and is forced downwardly through the larger perforated disc 24. By positioning the larger perforated disc as close as possible to the lowermost portion of partition 23, the passage of the fluid mixture directly from the inlet compartment to the outlet compartment without passing through at least the larger perforated disc is substantially prohibited. A portion of the mixture of oil and addition agent flows around tube 26 and upwardly through the perforated disc 24 into the outlet compartment of the mixing chamber, thence through outlet 11 for storage. A portion of the mixture of oil and addition agent flows through the smaller perforated disc 25 to the bottom of the mixing chamber and thence upwardly through the portion of perforated disc 25 on the outlet side of the mixing chamber, through the larger perforated disc 24, and into the outlet portion of the mixing chamber. The rapidly rotating discs through which the mixture of oil and addition agent is thus forced or flows thoroughly agitate the mixture and produce an extremely fine dispersion of the addition agent in the oil. The whirling motion imparted to the mixture as it passes into the outlet compartment of the mixing chamber serves further to mix uniformly the dispersion of addition agent in the oil.

The apparatus of my invention not only produces a treated hydrocarbon oil having uniform characteristics throughout but also reduces the amount of addition agent necessary to produce an oil having the desired physical characteristics. For example, I have found that while 0.333% by weight of a pour depressor heretofore required to produce a hydrocarbon lubricating oil having a desired low pour point, the same low pour point may be obtained with the same oil by the use of only 0.284% by weight of the pour depressor when incorporated in the oil by means of the apparatus of my invention. This reduction in the amount of pour depressor required to treat this particular oil represents a savings of approximately 15% in the amount of pour depressor used.

It will be seen, therefore, that the apparatus of my invention comprises a device characterized by simplicity of design and efficiency of operation. The use of this apparatus permits the ready production of a hydrocarbon oil containing an extremely fine and uniformly distributed dispersion of an addition agent. As a result of the use of this apparatus a considerable saving may be realized in the amount of addition agent required to produce an oil with the desired physical characteristics and, furthermore, a treated oil may be obtained having uniform physical characteristics even after a considerable period of storage.

I claim:

1. A mixing device for fluid mixtures which comprises a substantially closed mixing chamber provided with a partition therewithin extending from one end of the mixing chamber towards the other end thereof and dividing the mixing chamber into a plurality of compartments communicating only at one end of said partition, a rotatable shaft positioned in the plane of the partition, a perforated disk mounted on the shaft within the mixing chamber and adjacent the end of the partition at which the compartments communicate, whereby fluid mixture passing from one compartment to another will pass through said rotatable disk in one direction and then through said disk in the opposite direction, means for introducing a fluid mixture into one of said compartments, and means for withdrawing the fluid mixture from another of said compartments, said rotatable shaft extending substantially parallel to the direction of flow of the fluid mixture in said compartments.

2. A mixing device for fluid mixtures which comprises a substantially closed mixing chamber provided with a partition therewithin extending from one end of the mixing chamber towards the other end thereof and having a free end spaced from said other end of the mixing chamber, said partition dividing the mixing chamber into a plurality of compartments communicating only around the free end of said partition, a rotatable shaft positioned in the plane of the partition, a perforated disk mounted on the shaft within the mixing chamber and adjacent the free end of the partition whereby fluid mixture passing from one compartment to another will pass through said rotatable disk in one direction and then through said disk in the opposite direction, means for introducing a fluid mixture into one of said compartments, and means for withdrawing the fluid mixture from another of said compartments, said rotatable shaft extending substantially parallel to the direction of flow of the fluid mixture in said compartments.

3. A mixing device for fluid mixtures which comprises a substantially closed mixing chamber provided with a partition therewithin having an imperforate portion extending from one end of the mixing chamber towards the other end thereof and terminating a substantial distance from said other end, said partition dividing the mixing chamber into a plurality of compartments communicating only beyond the imperforate portions of said partition, a rotatable shaft positioned in the plane of the partition, a perforated disk mounted on the shaft within the mixing chamber and beyond the imperforate portion of the partition whereby fluid mixture passing from one compartment to another will pass through said rotatable disk in one direction and then through said disk in the opposite direction, means for introducing a fluid mixture into one of said compartments, and means for withdrawing the fluid mixture from another of said compartments, said rotatable shaft extending substantially parallel to the direction of flow of the fluid mixture in said compartments.

4. A mixing device for fluid mixtures which comprises a vertically-disposed substantially closed mixing chamber provided with a partition therewithin extending from the top of the mixing chamber downwardly through a portion of the chamber dividing the uppermost portion of the chamber into a plurality of compartments communicating only below the partition, a vertically disposed rotatable shaft positioned in the plane of the partition, a plurality of relatively spaced rotatable perforated disks mounted on the shaft within the mixing chamber and adjacent the lower end of the partition whereby fluid mixture passing from one compartment to another will pass downwardly and then upwardly through at least one of the rotatable disks, means for introducing a fluid mixture into one of said compartments, and means for withdrawing the fluid mixture from another of said compartments.

5. A mixing device for fluid mixtures which comprises a vertically-disposed, substantially closed mixing chamber having a partition therewithin extending from the top of the mixing chamber downwardly through a portion of the chamber dividing the upper portion of the chamber into two compartments communicating only below the partition, a vertically disposed rotatable shaft positioned substantially in the plane of said partition, a plurality of perforated disks mounted on the shaft in spaced relationship to one another within the mixing chamber and adapted to be rotated substantially horizontally by the shaft with the uppermost of the perforated disks positioned adjacent the lower end of the partition, whereby fluid mixture passing from one compartment to the other compartment will pass downwardly and then upwardly through at least one of the perforated disks, means for introducing a fluid mixture into one of said compartments, and means for withdrawing the fluid mixture from another of said compartments.

6. A mixing device for fluid mixtures which comprises a vertically-disposed, substantially closed mixing chamber provided with a partition therewithin extending from the top of the mixing chamber downwardly through a portion of the chamber dividing the uppermost portion of the chamber into a plurality of compartments communicating only below the partition, a vertically disposed rotatable shaft positioned in the plane of the partition, a plurality of relatively spaced rotatable perforated disks mounted on the shaft within the mixing chamber and adjacent the lower end of the partition whereby fluid mixture passing from one compartment to another will pass downwardly through one of the rotatable disks and then upwardly through the same disk, means for introducing a fluid mixture into one of said compartments, and means for withdrawing the fluid mixture from another of said compartments.

HERMAN AUGUST MEISSNER.